United States Patent [19]

Hoszowski

[11] Patent Number: 4,896,758
[45] Date of Patent: Jan. 30, 1990

[54] INSERT FOR A BOAT TRAILER ROLLER

[75] Inventor: Andrew K. Hoszowski, Greenville, Miss.

[73] Assignee: Moeller Mfg. Co., Greenville, Miss.

[21] Appl. No.: 271,277

[22] Filed: Nov. 15, 1988

[51] Int. Cl.$^4$ ............................................. B65O 13/00
[52] U.S. Cl. ........................................ 193/37; 29/129
[58] Field of Search ................. 193/37; 280/414.1;
114/260, 344; 29/115, 117, 121.6, 128, 129

[56] References Cited

U.S. PATENT DOCUMENTS

| 2,660,443 | 11/1953 | Miller | 280/414.1 X |
| 2,794,202 | 6/1957 | Schueler | 29/129 |
| 3,651,549 | 3/1972 | Casson, Jr. | 29/129 |
| 3,986,226 | 10/1976 | Roe et al. | 29/129 X |
| 4,358,008 | 11/1982 | Hillier | 193/37 |
| 4,779,887 | 10/1988 | Briggs | 280/414.1 |

Primary Examiner—Robert J. Spar
Assistant Examiner—Lyle Kimms
Attorney, Agent, or Firm—Berman, Aisenberg & Platt

[57] ABSTRACT

An insert for a roller for supporting a boat on a boat trailer includes a plastic sleeve surrounding a stationary shaft for the roller. The sleeve includes a plurality of spaced-apart longitudinal ridges extending radially outward along its length. A hollow rubber roller is fitted over the sleeve and the ridges are embedded into an interior diameter of the rubber roller, so that air circulates freely between the sleeve, the ridges and the roller. The roller may include load bearing sleeve supports, between the shaft and the sleeve, at each end of the insert.

9 Claims, 1 Drawing Sheet

INSERT FOR A BOAT TRAILER ROLLER

FIELD OF THE INVENTION

The invention relates to an insert for a boat-supporting roller of a boat trailer.

BACKGROUND OF THE INVENTION

Known boat-supporting rollers use a solid plastic sleeve insert or a steel sleeve insert around the roller shaft to reduce rolling friction. Known solid plastic inserts will melt and deform when forced into the interior diameter of a hot rubber roller which supports the boat.

The patent to Miller, U.S. Pat. No. 2,660,443, shows a boat keel supporting roller having a metal shaft surrounded by a sleeve and a roll each of which fits closely adjacent to the other. The Baron patent, U.S. Pat. No. 2,887,203, shows rollers each having a tubular resilient rubber sleeve coated with graphite to minimize frictional resistance when the roller is rotated on the inner sleeve. The sleeve may be a metallic, helically wound hose, and the interior of the sleeve is fitted with a plurality of resilient rods which may be galvanized spring steel.

The patent to Trumbull, U.S. Pat. No. 3,056,517, describes a boat trailer having boat supporting rollers in which each rubber roller is bonded to a central metal rod or shaft. The Kummerl patent, U.S. Pat. No. 4,299,022, describes a transport drum used for processing photographic film or paper. The apparatus includes an insert having a plurality of longitudinally extending ridges over which a cylindrical foam covering fits closely. The foam material is secured directly to the insert and ridges without any air channels therebetween.

SUMMARY OF THE INVENTION

A plastic insert for a boat trailer roller includes a sleeve surrounding the shaft of the roller having a plurality of spaced longitudinal ridges extending radially outward therefrom. A hot hollow resilient roller is fitted over the ridges of the insert causing the longitudinal ridges of the insert to be embedded in the internal diameter of the resilient roller leaving channels for circulation of ambient air along the length of the roller between the ridges. Force of the boat on the roller causes the ridges to be further embedded into the roller, providing increased support for the boat while maintaining the longitudinal air channels between the insert and the inner surface of the roller. Load bearing sleeve supports may be positioned between the shaft and the insert, at each end of the insert, so that the weight of the boat is transferred toward the supported ends of the shaft.

It is an object of the invention to provide an improved insert for a boat trailer roller.

DETAILED DESCRIPTION OF THE INVENTION

A plastic insert of the invention includes longitudinal ridges or spokes extending radially outward from an elongated shaft-surrounding sleeve. The insert is both lightweight and strong, and provides an anti-friction rolling surface for the inside diameter of a boat trailer roller of any shape or length. When a boat is supported on a resilient boat trailer roller incorporating an insert of the invention, the weight of the boat forces the ridges or spokes of the insert to be embedded into the inner diameter of the resilient boat-supporting roller.

In a preferred embodiment, additional load-bearing short sleeve supports are inserted between the shaft and the insert, under each end of the insert to transfer the load from the center of the insert to the supported ends of the shaft.

Figure 2:
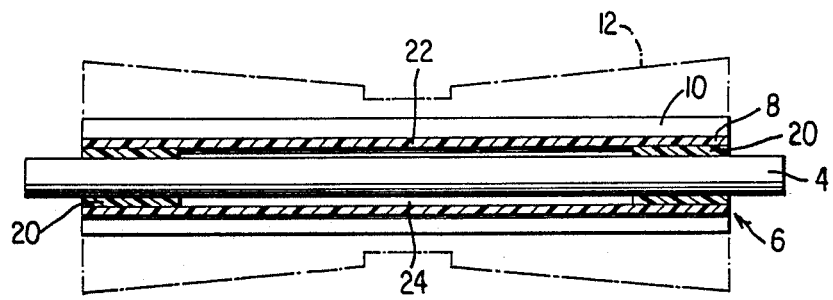
FIG. 2 is a longitudinal cross-sectional view of a roller of FIG. 1, showing additional sleeve supports of the invention.
Figure 1:
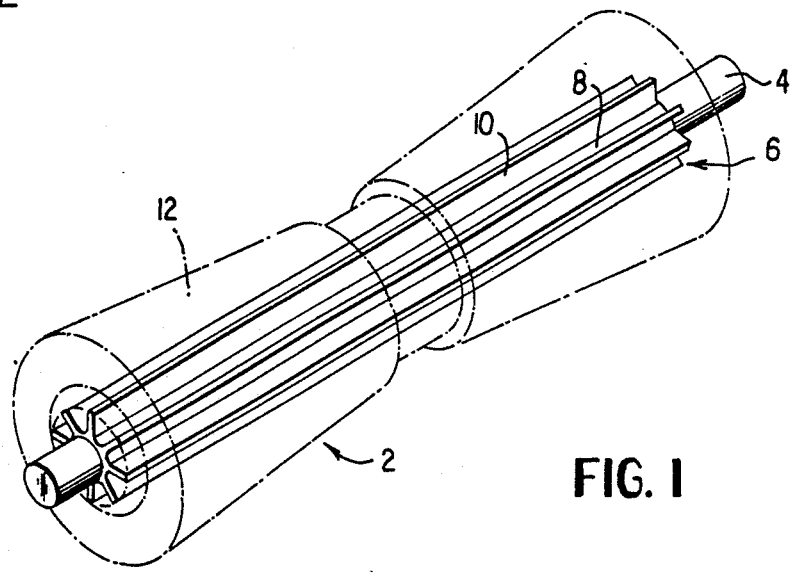
FIG. 1 is a perspective view of a roller including an insert of the invention.
Figure 3:
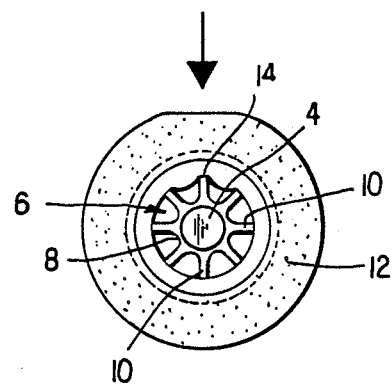
FIG. 3 is an end view of the roller of FIG. 1 showing the effect of force on the roller.

With reference to FIGS. 1 to 3 in which like numerals represent like parts, boat roller 2 is used for supporting the keel of a boat. Steel shaft 4 which supports the roller is an externally supported, stationary steel shaft attached to a boat trailer as is known in the art. Insert 6 fits around shaft 4. Insert 6 has an inner sleeve portion 8 which fits closely around shaft 4 and a plurality of longitudinal spokes or ridges 10 which extend radially from sleeve 8. FIG. 1, in a non-limiting example, shows insert 6 having eight spokes or ridges 10 extending from inner sleeve portion 8. Any suitable number of ridges may be used, and in general between six and twelve ridges are used.

The insert is usually made of plastic, such as acrylonitrile-butadiene-styrene (ABS) or polyvinyl chloride (PVC). Other suitable materials will be known to one skilled in the art.

In use, insert 6 is force fitted into a hot shaped rubber roller 12. The insert is supported on the shaft with the sleeve closely surrounding the shaft and the ends of the spokes distant from the sleeve embedded in the inner diameter of the roller, thus allowing ambient air to circulate through the spaces between the sleeve, the spokes and the roller, thereby preventing distortion of the plastic insert by the hot roller. If the insert were a solid plastic sleeve closely fitted between the shaft and the roller, the insert would melt and deform when forced into a hot rubber roller.

Using an insert of the invention, the insert may be forced, without deformation, into the internal diameter of a hot rubber roller immediately after the hot rubber is removed from the mold. As the rubber roller cools, it shrinks around the ends of the spokes of the plastic insert, and is permanently retained on the spokes which are forced to be embedded in the interior diameter of the rubber roller as the rubber cools. The spokes are thus supported and prevented from deflecting and rupturing under load. This effect is enhanced in use when a rolling load is applied to the outer surface of a roller, as at the arrow shown in FIG. 3. The load forces the spokes to be embedded more deeply into the inner surface of the roller, as at position 14, shown in FIG. 3, as a larger force is applied to the outer surface of roller 12. The resistance of the roller to sideward forces applied to the spokes as they rotate is thus increased. The insert rolls on the fixed shaft 4 together with the roller and a load applied to the roller is distributed through the spokes and the sleeve of the insert to the load-bearing steel shaft.

In a preferred embodiment, shown in FIG. 2, additional sleeve portions 20, which are preferably short open cylinders fitting closely inside the insert, and which rotate with roller 12 and insert 6, are fitted under each end of insert 6, adjacent sleeve portion 8. Sleeve portions 20, preferably made of ABS, nylon or delrin plastic, are load-bearing supporting sleeve portions which bear the load of a boat keel on the roller, transferring the load from the center of the insert to the externally supported ends of the shaft. Insert 6 is spaced from shaft 4 by sleeve portions 20, and center portion 22 of insert 6 is thus separated from shaft 4 by space 24.

The plastic insert and sleeve portions are strong, long-lasting and non-rusting. There are fewer parts to assemble than in a conventional boat trailer roller, and the insert of the invention is a lower cost and more satisfactory alternative to a solid plastic insert since less material is used and the insert may be satisfactorily fitted into a rubber roller while the rubber is still hot.

Ridges or spokes 10 preferably extend the length of sleeve 8 to provide support along the entire length of the roller supported on the steel shaft, and to allow ambient air to circulate freely through the hollow inner diameter of the roller, between the spokes. The spokes are preferably continuous along the length of the sleeve.

While the invention has been described above with respect to certain embodiments thereof, it will be appreciated that variations and modifications may be made without departing from the spirit and scope of the invention.

What is claimed is:

1. An insert for a hollow resilient roller for supporting a boat on a boat trailer comprising:

elongated sleeve means for surrounding a shaft for supporting said hollow roller; and
   a plurality of spaced-apart longitudinal ridge means for embedding in an inner diameter of the roller extending outward from the sleeve means along the length thereof forming a plurality of channel means for circulating air extending between said ridge means, said sleeve means and an interior surface of said hollow roller;
   whereby the force of the boat on the hollow resilient roller causes the ridge means to be further embedded in said roller, providing enhanced support for the boat.

2. An insert of claim 1 comprising plastic material.

3. An insert of claim 2 wherein the plastic material comprises acrylonitrile-butadiene-styrene polymer.

4. An insert of claim 1 comprising between six and twelve ridge means.

5. An insert of claim 4 wherein the longitudinal ridge means extend continuously along the elongated sleeve means.

6. An insert of claim 1 wherein each of said ridge means extends substantially radially outward from the sleeve means.

7. An insert of claim 1 further comprising sleeve support means positioned between the shaft and the sleeve means for bearing a load on the roller.

8. An insert of claim 7 wherein the sleeve means is spaced from the shaft.

9. An insert of claim 8 wherein the sleeve support means comprises two supports, a support being positioned between an end portion of the insert and the shaft.

* * * * *